(12) United States Patent
Noordegraaf

(10) Patent No.: US 8,076,380 B2
(45) Date of Patent: Dec. 13, 2011

(54) PARTICULATE EXPANDABLE POLYSTYRENE (EPS), PROCESS FOR MAKING PARTICULATE EXPANDABLE POLYSTYRENE, AS WELL AS A PARTICULAR APPLICATION OF POLYSTYRENE FOAM MATERIAL

(75) Inventor: Jan Noordegraaf, Wijchen (NL)

(73) Assignee: Synbra Technology B.V., Etten-Leur (NL)

( * ) Notice: Subject to any disclaimer, the term of this patent is extended or adjusted under 35 U.S.C. 154(b) by 998 days.

(21) Appl. No.: 11/358,908

(22) Filed: Feb. 21, 2006

(65) Prior Publication Data

US 2006/0189703 A1    Aug. 24, 2006

(30) Foreign Application Priority Data

Feb. 21, 2005   (NL) ..................................... 1028357

(51) Int. Cl.
   *C08J 9/16* (2006.01)
   *C08J 9/228* (2006.01)
   *C08J 9/00* (2006.01)
   *C08K 7/22* (2006.01)

(52) U.S. Cl. ............. 521/56; 521/82; 524/370; 523/218

(58) Field of Classification Search .................... 521/56; 524/370

See application file for complete search history.

(56) References Cited

U.S. PATENT DOCUMENTS

| | | | |
|---|---|---|---|
| 3,994,836 A | 11/1976 | Honer | 260/2.5 |
| 6,414,041 B1 | 7/2002 | Glueck | 521/56 |
| 6,444,714 B1 | 9/2002 | Gluck et al. | 521/56 |
| 6,538,042 B1 * | 3/2003 | Berghmans et al. | 521/58 |
| 2002/0107315 A1 * | 8/2002 | Chaudhary et al. | 524/371 |

FOREIGN PATENT DOCUMENTS

| | | |
|---|---|---|
| DE | 29616363 | 11/1996 |
| DE | 20108311 | 8/2001 |
| EP | 0915127 | 5/1999 |
| EP | 0994145 | 4/2000 |
| GB | 1138473 | 1/1969 |
| JP | 58031987 | 2/1983 |
| KR | 2001088725 | 9/2001 |
| KR | 2003002003 | 1/2003 |
| WO | WO 00/43442 | 7/2000 |

OTHER PUBLICATIONS

"What are Zeolites?" Bell. (2001).*
Natural and Synthetic Zeolites Data Sheet. 1997. Reade Advanced Materials.*

* cited by examiner

*Primary Examiner* — Randy Gulakowski
*Assistant Examiner* — Kara Negrelli
(74) *Attorney, Agent, or Firm* — Roberts & Roberts, LLP

(57) ABSTRACT

The present invention relates to a particulate expandable polystyrene (EPS) that can be processed into a foam with a fine cell structure and a low density and contains a material for increasing the thermal insulation value, to improve the thermal insulation value hereof. The present invention also relates to a method for the production of a particulate expandable polystyrene (EPS) and to a foam material based on polystyrene.

19 Claims, No Drawings

PARTICULATE EXPANDABLE POLYSTYRENE (EPS), PROCESS FOR MAKING PARTICULATE EXPANDABLE POLYSTYRENE, AS WELL AS A PARTICULAR APPLICATION OF POLYSTYRENE FOAM MATERIAL

A particulate expandable polystyrene (EPS), a method for the production of a particulate expandable polystyrene and a special application of polystyrene foam material.

The present invention relates to a particulate expandable polystyrene (EPS) that can be processed into a foam with a fine cell structure and a low density and contains a material for increasing the thermal insulation value, to improve the thermal insulation value hereof. The present invention also relates to a method for the production of a particulate expandable polystyrene (EPS) and to a foam material based on polystyrene.

Such a method is known per se from the international application WO 00/43442, according to which styrene polymer is melted in an extruder and is at least mixed with a blowing agent and aluminium particles, which are predominantly in the shape of plates, and jointly extruded, the employed concentration of aluminium particles being at most 6 wt. %, after which the extrudate is cooled and reduced to particles. Such polymers contain at least particulate aluminium to improve the thermal-insulation properties hereof, the aluminium particles being homogeneously distributed and incorporated as an infrared-radiation-reflecting material. The aluminium particles have a plate-like shape whose dimensions vary from 1 to 15 mm.

From German Gebrauchsmusterschrift DE 201 08 311 U1 a sound-insulation element is known that possesses expanded styrene polymer, the styrene polymer having a density of less than 15 kg/m$^3$ and a particulate additive being homogeneously distributed in the styrene polymer, the density of said additive being higher than the density of the styrene polymer. The additive is an infrared-reflecting or -absorbing material and is in the form of metal particles, in particular aluminium in the shape of plates or a metal oxide, non-metal oxide, antimony trisulphide, carbon black or graphite.

U.S. Pat. No. 3,994,836 relates to a method for the production of moulded parts from foamed polystyrene, which moulded parts have an increased fire-resistance. Such increase is achieved by using a hot water medium that contains an alkaline silicate. Such a method is carried out by placing EPS beads in a cubic mould, which mould is subsequently immersed into a bath of about 70° C., which bath contains an aqueous solution of alkali silicate. This method hence discloses a process involving the addition of pre-expanded beads to a hot solution of silicates. These silicates are added outside the beads, and hence within the matrix prior to pre-expansion.

British patent GB 1,138,473 relates to a method for the production of thermoplastic foams, which refers to a polystyrene foam made from polymers and copolymers of styrene, which foams are directly expanded. The method known from this British patent comprises the introduction of an expansion liquid into a melted polymer composition containing porous particles of an inorganic material, which method can for example be carried out in an extruder. A gas or liquid can be used as a suitable expansion agent, for example carbon dioxide, nitrogen or an alkyl halogenide, the examples describing only the use of methyl chloride. The use of methyl chloride must be seen as a plasticizer to plasticize the structure, which implies that methyl chloride is indispensable. The density of the foam material thus obtained from the extruder directly as a plate has a value of 0.02 or even lower. Among the mentioned examples of inorganic materials used as a nucleator are silica, aluminium oxide, activated carbon, kaolin and magnesia.

Japanese patent publication JP 05 186626 relates to a composition obtained by impregnating an inorganic gas in a resin composition that contains a thermoplastic resin and porous bodies with an average particle size of up to 500 μm. A number of thermoplastic resins are known from this document, among which is a resin of the polystyrene type, with active carbon and clay being mentioned as the porous body.

Japanese patent publication JP 58 031987 relates to a foamed synthetic resin granule, to the surface of which adhere one or more (in)organic substances, polystyrene being one of the examples mentioned as the synthetic resin. Active carbon, besides other substances such as zeolite, aluminium dioxide or ceramic materials, can be used as the inorganic substance. The use of such a material must be seen in the treatment of wastewater, with microorganisms adhering to such a granule. The method known therefrom provides for the gluing of particles to a surface to obtain adhesion for microbes.

U.S. Pat. No. 6,444,714 relates to a method for producing a particulate expandable polystyrene (EPS) according to which styrene is polymerised in an aqueous suspension in the presence of 5-50 wt. % expandable graphite, which results in styrene particles with an average size of 0.2-2.0 mm. Because the use of such a high percentage of graphite causes the viscosity of the mixture to increase, processing will take place at high temperatures, in particular 130° C., which will make it increasingly difficult to retain the blowing agent pentane after the polymerisation.

German Gebrauchsmuster DE 296 16 363 U1 relates to a method for the production of a flexible polystyrene foam with a density of 5 to 20 g/l which contains 3 to 10 wt. % carbon black or graphite.

European patent application No. 0 994 145 relates to a foam material based on styrene polymer that contains 5-50 wt. % expandable hexagonal graphite. Such a foam material can be obtained by applying expandable graphite to the pre-foamed particles of the styrene polymer, after which the particles are coated with graphite material.

An expandable polystyrene (EPS) containing 0.1 to 25 wt. % graphite particles with an average size of more than 50 mm is known from U.S. Pat. No. 6,414,041. Such a polystyrene material is obtained by means of polymerisation in an aqueous suspension in the presence of a blowing agent.

Known from European patent application No. 0 915 127 is such a particulate expandable polystyrene (EPS) with the EPS particles, which contain 0.5 to 8 wt. % graphite, being coated with a hydrophobic agent in an amount of between 0.001 and 0.5 wt. %, paraffin wax with between 10 and 30 carbon atoms in the carbon chain being mentioned in particular as the hydrophobic agent. Such particles also contain an organic bromine compound with a bromine content of at least 70 wt. % as a flame-retardant.

A method for increasing the thermal insulation of EPS is known per se from the international application WO 00/43442, according to which styrene polymer is melted in an extruder and is mixed at least with a blowing agent and aluminium particles, which are predominantly plate-shaped, and jointly extruded, the employed concentration of aluminium particles being at most 6 wt. %, after which the extrudate is cooled and reduced to particles. Such polymers contain at least particulate aluminium to improve the thermal insulation properties hereof, the aluminium particles being homogeneously distributed and incorporated as an infraredradiation-reflecting material. The aluminium particles dispose over a plate-like shape whose dimensions vary from 1 to 15 mm.

A particulate expandable polystyrene is known from European patent application No. 0 915 127, the EPS particles being in an amount of between 0.001 and 0.5 wt. % coated with a hydrophobic agent, in particular a paraffin wax, the EPS particles moreover containing between 0.5 and 8 wt. % graphite. From said European patent application it is also known that other suitable agents for increasing the thermal insulation value can be added, such as aluminium powder, metal oxides, such as iron oxide and aluminium oxide, and carbon particles such as carbon black.

A foam panel with a reduced thermal conductivity is known from European patent application No. 1 031 610, the panel containing between 0.5 and 5 wt. % graphite particles with an average particle size of between 1 and 100 μm.

The raw material that is used to produce expandable polystyrene (EPS) can be obtained not only via the extrusion process, as known from the aforementioned international application, but also via suspension polymerisation. The EPS granulate thus obtained is generally used as a raw material in the packaging and building industries. The method for the further processing comprises a pre-foaming operation, during which an amount of steam is in an expansion vessel passed through a layer of EPS granules, causing the blowing agent present in the EPS granules, usually pentane, to evaporate, during which the foaming of the granules takes place. After a storage period of about 4-48 hours, also known as curing, the granule thus prefoamed is introduced into a mould, the granules being further expanded under the influence of steam. The employed mould is provided with small openings so that the blowing agent still present can escape during the expansion while the granules fuse into the desired shape. The dimensions of this mould are in principle not limited, so that both blocks for the building industry and meat trays or fish containers can be obtained.

The technology employed in the documents discussed above all ensures that the insulation value of the ultimate foamed shape will increase to a certain extent. A drawback of the end product is however that the foamed shape obtained possesses a black or somewhat dirty grey colour. This drawback is caused by the addition of the agent for increasing the thermal insulation value. The problem that this causes in practice is that in a production environment, in which in general a standard white type of EPS and a somewhat black type of EPS are processed, contamination of the batches takes place in such cases. Such contamination, also referred to as cross-contamination, causes the intended black end product to have a somewhat white contamination and the intended white end product to have a black/grey contamination. Such discolouration is hence undesirable.

Another drawback is that the agents for increasing the thermal insulation value, which are black, have a substantially higher cost price than the styrene monomer/polystyrene basic raw material, as a result of which the black types of EPS foam that are produced from the aforementioned raw materials can be produced only at substantially increased production costs. It can be added that every type of agent for increasing the thermal insulation value has its own black/grey colour, so that such agents cannot be used mixed in a production environment without cosmetic problems.

A first aspect of the present invention is the provision of a particulate expandable polystyrene (EPS) granule with which, after further processing, EPS foam is obtained that possesses a practically desirable, sufficiently low thermal conductivity coefficient to be capable of being thus used to obtain the intended thermal insulation properties.

Another aspect of the present invention is the provision of a method for producing an expandable polystyrene (EPS) granule, according to which styrene polymers can in the presence of one or more additional components be converted into a material which, after foaming and moulding, possesses an increased thermal insulation value.

Another aspect of the present invention is the provision of a particulate expandable polystyrene (EPS) foam which in its final form, after foaming and moulding, also meets the fire-resistance requirements according to the B2 test, notably DIN 4102, part 2.

Another aspect of the present invention is the provision of a particulate expandable polystyrene (EPS) foam, to which an agent for increasing the thermal insulation value has been added, which in its final form, after foaming and moulding, does not cause any undesired black/grey discolouration of the end product.

Another aspect of the present invention is the provision of a process for the production of an expandable polystyrene (EPS) granule, it being possible for the process to be carried out using a number of different agents for increasing the thermal insulation value without any risk of cross-contamination.

The invention as referred to in the introduction is characterized in that the polystyrene particles contain a material for increasing the thermal insulation value chosen from the group comprising zeolites and silicates.

One or more aspects of the present invention are met by using such a material for increasing the thermal insulation value. The invention must in particular be seen in the introduction of hollow structures that scatter thermal radiation and, in view of the wavelength of the radiation, the particles of the material for increasing the thermal insulation value must have a desired size. The present inventors assume that the irregular structure of the aforementioned group of materials for increasing the thermal insulation value ensures that the thermal radiation that reaches the surface of the aforementioned materials will there find a labyrinth by which the thermal radiation will be absorbed. It must however be clear that the present inventors are in no way bound to such a theory. Also mentioned as examples of suitable materials for increasing the thermal insulation value are Al—Si oxides, Si oxides, kaolin, $K_2O$—$SiO_2$—$Al_2O_3$ and perlite vermiculite expanded clay.

In a particular embodiment it is desirable for the amount of material for increasing the thermal insulation value to be 0.1-30 wt. %, based on styrene polymer, preferably 0.1-15 wt. %, in particular 1.5-7 wt. %. It is also desirable for the density of the EPS to lie in the range of 850-1050 $kg/m^3$.

It must be clear that it is in particular embodiments desirable for the particulate expandable polystyrene to additionally contain one or more other agents for increasing the thermal insulation value chosen from the group comprising active carbon, graphite, aluminium powder, $Al(OH)_3$, $Mg(OH)_2$, $Al_2O_3$, iron, zinc, copper and alloys thereof. The particle size of the aforementioned agents preferably exceeds 5 μm.

To obtain expandable polystyrene (EPS) that has a good flame-retardant effect it is preferable for the styrene polymer to contain a flame-retardant, in particular hexabromocyclododecane (HBCD), before the extrusion takes place.

If the product obtained after extrusion must meet strict fire-safety requirements it is desirable for one or more flame retardants chosen from the group comprising hexabromocyclododecane (HBCD), dicumyl peroxide and 2,3-dimethyl-2,3-diphenylbutane to be additionally separately supplied to the extruder during the extrusion, the amount hereof lying between 1.0 and 8 wt. %, based on the amount of styrene polymer.

The present invention also relates to a method for the production of a particulate expandable polystyrene (EPS), which is characterized in that styrene polymer is supplied to an extruder and is mixed with at least a blowing agent, the usual additives and a material for increasing the thermal insulation value, and subsequently extruded, cooled and reduced to particles. The material thus obtained serves as a raw material for the foaming and moulding process. The raw materials used for the foaming and moulding process are in many embodiments provided with an expansion-promoting coating based on stearates.

In a particular embodiment it is possible that, to produce a particulate expandable polystyrene (EPS), styrene polymer is supplied to an extruder together with a material for increasing the thermal insulation value and the usual additives, after which the intermediate thus obtained is subjected to an impregnation treatment with a blowing agent to obtain particles containing the blowing agent. Gasification with a blowing agent in an extruder can be mentioned as an example of a suitable impregnation treatment. Another, preferable, impregnation treatment is to transfer the extruded EPS granules to a reactor to which the blowing agent is supplied under overpressure, for example pentane at an overpressure in the range of 2-10 bar.

In a particular embodiment the present invention also relates to a process for the production of a particulate expandable polystyrene (EPS) according to which styrene monomer, a blowing agent, an agent for increasing the thermal insulation value and the usual additives are subjected to a polymerisation reaction in a reactor, characterized in that a material for increasing the thermal insulation value chosen from the group comprising zeolites and silicates is added as the agent for increasing the thermal insulation value. It is particularly desirable for the density of the EPS to lie in the range of 850-1050 $kg/m^3$.

The present invention also relates to a polystyrene foam material based on particulate expandable polystyrene (EPS) as described above, the polystyrene foam material preferably being used for thermal insulation purposes. After expansion, the foam material has a density of 9-100 $kg/m^3$, in particular 15-30 $kg/m^3$.

The invention will be elucidated below with reference to a number of examples and comparative examples, to which it should however be added that the present invention is in no way limited to such examples.

COMPARATIVE EXAMPLE A

EPS granules containing 5% pentane (particle size=0.3-2.4 mm) and 0.2 wt. % zinc stearate are extruded in an extruder. The results obtained are summarised in the table below. No material for increasing the thermal insulation value was coextruded in Comparative Example A and the lambda value obtained was 0.0369 mW/mK.

EXAMPLE B ACCORDING TO THE PRESENT INVENTION

The same operations as in Comparative Example A were repeated, except that 5% zeolite type Ze-508 (marketed by Ineos Silicas B.V., Eijsden (NL) (bulk density=1000 $kg/m^3$)) was coextruded.

EXAMPLE C ACCORDING TO THE PRESENT INVENTION

The same operations as in Comparative Example A were repeated, except that 5 wt. % zeolite type Ze-509 (marketed by Ineos Silicas B.V., Eijsden (NL)) (bulk density=1000 $kg/m^3$) was coextruded.

EXAMPLE D ACCORDING TO THE PRESENT INVENTION

The same operations as in Comparative Example A were repeated, except that 2.5 wt. % Neosil silicate CT11 (marketed by Ineos Silicas B.V., Eijsden (NL)) (bulk density=80 $kg/m^3$) was coextruded as the agent for increasing the thermal insulation value.

Comparative Example A and Examples B-D according to the present invention were carried out under the same conditions using the same extruder and subsequently coated with 0.4 wt. % zinc stearate before prefoaming and moulding took place. From the table below it is clear that the addition of an agent for increasing the thermal insulation value caused the lambda value to decrease, the addition of silicate (Example D) leading to a greater decrease than the addition of zeolite (Examples B-C).

EXAMPLE E ACCORDING TO THE PRESENT INVENTION

The same operations as in Example D were repeated, except that 0.8 wt. % HBCD and 0.3 wt. % dicumyl peroxide were coextruded.

EXAMPLE F ACCORDING TO THE PRESENT INVENTION

The same operations as in Example D were repeated, except that 0.8 wt. % HBCD and 0.5 wt. % dicumyl were coextruded.

EXAMPLES G-I ACCORDING TO THE PRESENT INVENTION

The same operations as mentioned in Example F were repeated, except that different types of silicate were used, notably Ineos type SD 4092 (bulk density=150 $kg/m^3$; Example G), SD 4093 (bulk density=250 $kg/m^3$; Example H) and SD 4094 (bulk density=350 $kg/m^3$; Example I) in Examples G, H and I, respectively. It should be added that the materials obtained in Examples E, F, G, H and I all met the DIN B2 test as regards fire resistance.

Examples B-I showed that the addition of a white material for increasing thermal insulation led to a favourable lambda value when the extrusion process was applied. In Example J it was investigated whether a polymerisation method will also lead to the desired result.

EXAMPLE J ACCORDING TO THE PRESENT INVENTION 2250 g silicate was added to 10 litres of styrene monomer, after which, after 30 minutes' stirring, the suspension was added to 100 litres of styrene. Next, 0.12 wt. % butyl peroxyethylhexylcarbonate, 0.4 wt. % dibenzyl peroxide, 0.35 wt. % dicumyl and 0.8 wt. % HBCD were added. After some time 100 litres of water was added, to which 0.25 wt. % tricalcium phosphate, 0.02 wt. % sodium pyrophosphate and 0.01 wt. % magnesium sulphate had been added. The mixture thus obtained was with stirring heated until polymerisation started spontaneously. At a degree of conversion of 95%, 0.02 wt. % PVP and 6 wt. % pentane/isopentane were added in a ratio of 3:1. After impregnation the temperature was raised to 120° C. for the post-polymerisation, after which the end product was cooled to a temperature of 20° C. The material thus obtained was provided with a standard coating based on metal stearates, prefoamed to 16 g/l, stored in a silo for 24 hours and subsequently shaped into a moulded part whose insulation value was determined.

EXAMPLE K ACCORDING TO THE PRESENT INVENTION

The recipe as mentioned in Example H was used, the material obtained after extrusion to granules subsequently being impregnated with pentane in a reactor, with 5% pentane being added at an impregnation pressure of 6 bar overpressure.

EXAMPLES L-M ACCORDING TO THE PRESENT INVENTION

The same recipe as in Example H was used, except that the impregnation was carried out in a gasification extruder by injecting pentane into the extruder.

TABLE

| Experiment | Density (kg/m$^3$) | Lambda (mW/mK) |
|---|---|---|
| A* | 17.4 | 0.0369 |
| B$^\Delta$ | 17 | 0.0354 |
| C$^\Delta$ | 18 | 0.0353 |
| D$^\Delta$ | 17 | 0.0337 |
| E$^\Delta$ | 17 | 0.035 |
| F$^\Delta$ | 17.1 | 0.034 |
| G$^\Delta$ | 16.9 | 0.0346 |
| H$^\Delta$ | 17.1 | 0.0344 |
| I$^\Delta$ | 18.1 | 0.0342 |
| J$^\Delta$ | 17.1 | 0.033 |
| K$^\Delta$ | 17.3 | 0.0335 |
| L$^\Delta$ | 17.1 | 0.034 |
| M$^\Delta$ | 17.3 | 0.034 |

Comments:
*= comparative example
$^\Delta$= example according to the invention

The invention claimed is:

1. A particulate expandable polystyrene that can be processed into a foam with a fine cell structure and a low density and contains a material for increasing the thermal insulation value, to improve the thermal insulation value thereof, the particulate expandable polystyrene consisting of polystyrene polymer particles that consist of a polystyrene polymer, which particles contain a material for increasing the thermal insulation value chosen from the group consisting of zeolites and silicates, wherein the amount of material for increasing the thermal insulation value is 1.5-7 wt. %, based on the polystyrene polymer.

2. The particulate expandable polystyrene according to claim 1 further comprising one or more other agents for increasing the thermal insulation value chosen from active carbon, graphite, aluminum powder, $Al(CH)_3$, $Mg(OH)_2$, $Al_2O_3$, iron, zinc, copper and alloys thereof are additionally present in the particulate expandable polystyrene.

3. The particulate expandable polystyrene according to claim 1 further comprising one or more flame-retardants chosen from hexabromocyclododecane, dicumyl peroxide and 2,3 dimethyl-2,3-diphenylbutane are present in a styrene polymer.

4. The particulate expandable polystyrene according to claim 1 wherein the density of the particulate expandable polystyrene lies in the range of 850-1050 kg/m$^3$.

5. A polystyrene foam material consisting essentially of the particulate expandable polystyrene according to claim 1.

6. The polystyrene foam material according to claim 1, wherein after expansion, the polystyrene foam material has a density in the range of 9-100 kg/m3.

7. The polystyrene foam material according to claim 1, wherein after expansion, the polystyrene foam material has a density in the range of 25-30 kg/m3.

8. The particulate expandable polystyrene of claim 1 wherein said material for increasing the thermal insulation value is present in the form of hollow structures.

9. The polystyrene foam material of claim 1 wherein said material for increasing the thermal insulation value is present in the form of hollow structures.

10. The polystyrene foam material of claim 1 further comprising one or more flame-retardants.

11. The particulate expandable polystyrene of claim 1 wherein the material for increasing the thermal insulation value has a bulk density of up to 1000 kg/m$^3$.

12. The particulate expandable polystyrene of claim 1 wherein the material for increasing the thermal insulation value has a bulk density of up to 350 kg/m$^3$.

13. The particulate expandable polystyrene of claim 1 wherein the material for increasing the thermal insulation value has a bulk density of from 100 kg/m$^3$ to 250 kg/m$^3$.

14. A method for the production of particulate expandable polystyrene, wherein the particulate expandable polystyrene consists of polystyrene polymer particles, a blowing agent, and a material for increasing the thermal insulation value, said method consisting of mixing the particulate expandable polystyrene, blowing agent, and material for increasing thermal insulation value in an extruder, the resultant mixture of which is extruded, cooled, and reduced to particles, wherein the material for increasing the thermal insulation value is chosen from the group consisting of zeolites and silicates, and wherein the amount of material for increasing the thermal insulation value is 1.5-7 wt % based on the polystyrene polymer particles.

15. The method for the production of a particulate expandable polystyrene according to claim 14 wherein styrene polymer, and the material for increasing the thermal insulation value are jointly extruded in an extruder to form an intermediate, after which the intermediate thus obtained is subjected to cooling, reduced to particles, and is subsequently subjected to an impregnation treatment with a blowing agent.

16. The method according to claim 15, wherein the impregnation treatment is carried out in an extruder.

17. The method according to claim 16, wherein the impregnation treatment is carried out in a reactor at elevated pressure.

18. The method for the production of a particulate expandable polystyrene according to claim 14, wherein styrene monomer, the blowing agent, and the agent for increasing the thermal insulation value are subjected to a polymerization reaction in a reactor.

19. The method according to claim 14 wherein the density of the particulate expandable polystyrene lies in the range of 850-1050 kg/m$^3$.

* * * * *